United States Patent [19]
Hu

[11] Patent Number: 6,088,184
[45] Date of Patent: Jul. 11, 2000

[54] APPARATUS AND METHOD FOR THE CONTROL AND POSITIONING OF MAGNETIC RECORDING HEADS IN AN AZIMUTH RECORDING SYSTEM

[75] Inventor: Paul Yu-Fei Hu, Tucson, Ariz.

[73] Assignee: International Business Machines Corporation, Armonk, N.Y.

[21] Appl. No.: 09/098,283

[22] Filed: Jun. 16, 1998

[51] Int. Cl.[7] .................................................. G11B 5/00
[52] U.S. Cl. ............................................. 360/76; 75/69
[58] Field of Search .................................. 360/75, 69, 76, 360/77.01, 77.12, 77.16, 110, 48

[56] References Cited

U.S. PATENT DOCUMENTS

| | | | |
|---|---|---|---|
| 3,813,766 | 6/1974 | Brock et al. | 29/603 |
| 4,373,173 | 2/1983 | Robinson et al. | 360/121 |
| 4,648,087 | 3/1987 | Scranton et al. | 360/103 |
| 4,729,048 | 3/1988 | Imakoshi et al. | 360/103 |
| 4,823,205 | 4/1989 | Hannon et al. | 369/14 |
| 4,924,334 | 5/1990 | Diepers et al. | 360/77.07 |
| 5,307,217 | 4/1994 | Saliba | 360/76 |
| 5,371,638 | 12/1994 | Saliba | 360/77.12 |
| 5,432,652 | 7/1995 | Comeaux et al. | 360/77.12 |
| 5,448,438 | 9/1995 | Kasetty | 360/106 |
| 5,474,253 | 12/1995 | Kasetty et al. | 242/614 |
| 5,508,865 | 4/1996 | La Garcia et al. | 360/109 |
| 5,675,447 | 10/1997 | Goker et al. | 360/48 |
| 5,847,892 | 12/1998 | Goker | 360/76 |

FOREIGN PATENT DOCUMENTS

| | | |
|---|---|---|
| 59-185020 | 10/1984 | Japan . |
| 6506081 | 7/1994 | Japan . |
| WO94/00839 | 1/1994 | WIPO . |

OTHER PUBLICATIONS

IBM Technical Disclosure Bulletin, vol. 20, No. 9, Feb. 1978, Read/Write Servo Magnetic Head, D. R. McEfee.

IBM Technical Disclosure Bulletin, vol. 19, No. 11, Apr. 1977, Multielement Head Design for Seperate Clock/Function Sensing, T. A. Schwarz.

*Primary Examiner*—Muhammad Edun
*Attorney, Agent, or Firm*—Douglas R. Millett; Felsman, Bradley, Vaden, Gunter & Dillon, LLP

[57] ABSTRACT

A magnetic recording apparatus and method for the azimuthal recording of data to and from data storage tracks contained on digital linear tape. The magnetic recording apparatus includes a magnetic data recording head assembly. A magnetic recording head is centrally located within the magnetic data recording head assembly. The magnetic data recording head assembly includes a control device coupled to a left servo sensor, wherein the left sensor is located to the left of and external to the magnetic recording head. The magnetic recording apparatus additionally includes a control device coupled to a right servo sensor, wherein the right servo sensor is located to the right of and external to the magnetic recording head. The left and right servo sensors assist the magnetic recording head to tilt and rotate at a predetermined angle with respect to a particular data storage track contained on a digital linear tape, during a recording operation, thereby increasing recording density and providing improved azimuthal recording.

22 Claims, 10 Drawing Sheets

APPARATUS AND METHOD FOR THE CONTROL AND POSITIONING OF MAGNETIC RECORDING HEADS IN AN AZIMUTH RECORDING SYSTEM

BACKGROUND OF THE INVENTION

1. Technical Field

The present invention relates to an improved information-retrieval apparatus. In particular, the present invention relates to an improved digitally-based information-retrieval apparatus. More particularly, the present invention relates to magnetic storage media, such as digital recording tapes. Still more particularly, the present invention relates to magnetic recording heads for writing and reading data to digital recording tapes.

2. Description of the Related Art

Various magnetic recording techniques exist for recording data to and from magnetic storage media, such as magnetic tape. Magnetic tapes are used for data storage in computer systems requiring data removability, low-cost data storage, high data-rate capability, high volumetric efficiency and reusability. The constantly increasing operational speeds of digital computers are creating a demand for corresponding increases in the data storage capacities of magnetic tape recording and reproducing systems, while maintaining the special requirements of high speed digital tape systems.

Tape recording and reproducing systems for use as computer data storage devices are required to provide high data transfer rates and to perform a read check on all written data. To satisfy these requirements, conventional tape systems typically employ methods of recording known as linear recording, in which the tracks of data lie parallel to each other and to the edge of the tape. Linear recording techniques offer high data transfer rates. However, it is desirable to obtain even higher data densities while retaining the advantages of such recording techniques.

Digital linear tape (DLT) is a magnetic linear tape medium that is increasingly being utilized as a medium for data storage. DLT is a magnetic storage medium used to back up data, typically in computer systems. DLT allows for the rapid transfer of data, in comparison to other tape storage technologies. For example, various forms of magnetic read/write heads can be utilized in association with servo mechanisms to read and write data to and from a track of a particular DLT.

Because DLT is currently being utilized as an important tool for data storage, it is desirable to increase the recording density, thus allowing for the faster and more efficient retrieval and writing of data. One method of increasing this storage density involves azimuth recording. The term "azimuth" refers to the horizontal angular distance from a particular reference direction. The use of the word "azimuth" in "azimuth recording" thus suggests a form of angular recording.

Azimuth recording involves the use of a rotating recording head, such that data tracks on a tape may be recorded at different angles with respect to the edge of the tape. Azimuth recording results in a recorded track pattern in which the magnetization directions of adjacent data tracks lie at different azimuth angle to each other. To date, most recording systems have relied strictly on magnetic heads which contain read/write elements but which record only vertically, thus not allowing for angular or "azimuthal" recording of data. One of the principal advantages of azimuth recording over non-azimuth recording is that azimuth recording promotes very high data track packing. Azimuth recording provides much denser track packing than regular track packing spacing because regular track packing spacing typically requires gaps between tracks.

Those systems which do attempt to implement azimuth recording techniques are faced with the challenge of providing fine positioning servo tracking. Servo tracking techniques have been developed to reduce the effects of tracking error and thus improve the data capacity of tape systems. Known servo techniques vary widely, but most involve methods of dynamically moving a read head gap to continually reposition it over a written servo track. The movement of a servo read head gap compensates for lateral tape motion during a read. However, lateral tape motion during writing is not controlled with respect to the write head gap. Thus, the distance between tracks is still limited to the magnitude of the lateral tape motion in order to avoid over-writing previously written tracks.

Based on the foregoing it can be appreciated that a need exists for an improved azimuth recording system which does not encounter problems associated fine positioning servo tracking. A need also exists for an inexpensive and easy to implement apparatus and method which provides fine positioning servo tracking. It is believed that the apparatus and method presented herein solves these problems.

SUMMARY OF THE INVENTION

It is therefore an object of the invention to provide an improved information-retrieval apparatus and method.

It is another object of the invention to provide an improved digitally-based information-retrieval apparatus and method.

It is yet another object of the invention to provide an improved magnetic recording head.

It is still another object of the present invention to provide improved positioning servo tracking in association with azimuth recording of data to and from magnetic recording tapes.

The above and other objects are achieved as is now described. A magnetic recording apparatus and method for the azimuthal recording of data to and from data storage tracks contained on digital linear tape is disclosed. The magnetic recording apparatus includes a magnetic data recording head assembly. A magnetic recording head is centrally located within the magnetic data recording head assembly. The magnetic data recording head assembly includes a control device coupled to one or more left servo sensors, wherein the left servo sensors are located to the left of and adjacent and external to the centrally located magnetic recording head. The magnetic recording apparatus additionally includes a control device coupled to one or more right servo sensors, wherein the right servo sensors are located to the right of and adjacent and external to the centrally located magnetic recording head. The left and right servo sensors assist the centrally located magnetic recording head to tilt and rotate at a predetermined angle with respect to a particular data storage track contained on a digital linear tape, during a recording operation, thereby increasing recording density and providing improved azimuthal recording.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 1(b) is an exploded view of the magenetic head assembly of FIG. 1(a), in accordance with a preferred embodiment of the present invention;

FIG. 5(b) depicts a top view of an azimuth recording magnetic head in both a normal recording pattern and an azimuthal recording pattern, in accordance with a preferred embodiment of the present invention;

DETAILED DESCRIPTION OF PREFERRED EMBODIMENT

Figure 1A:
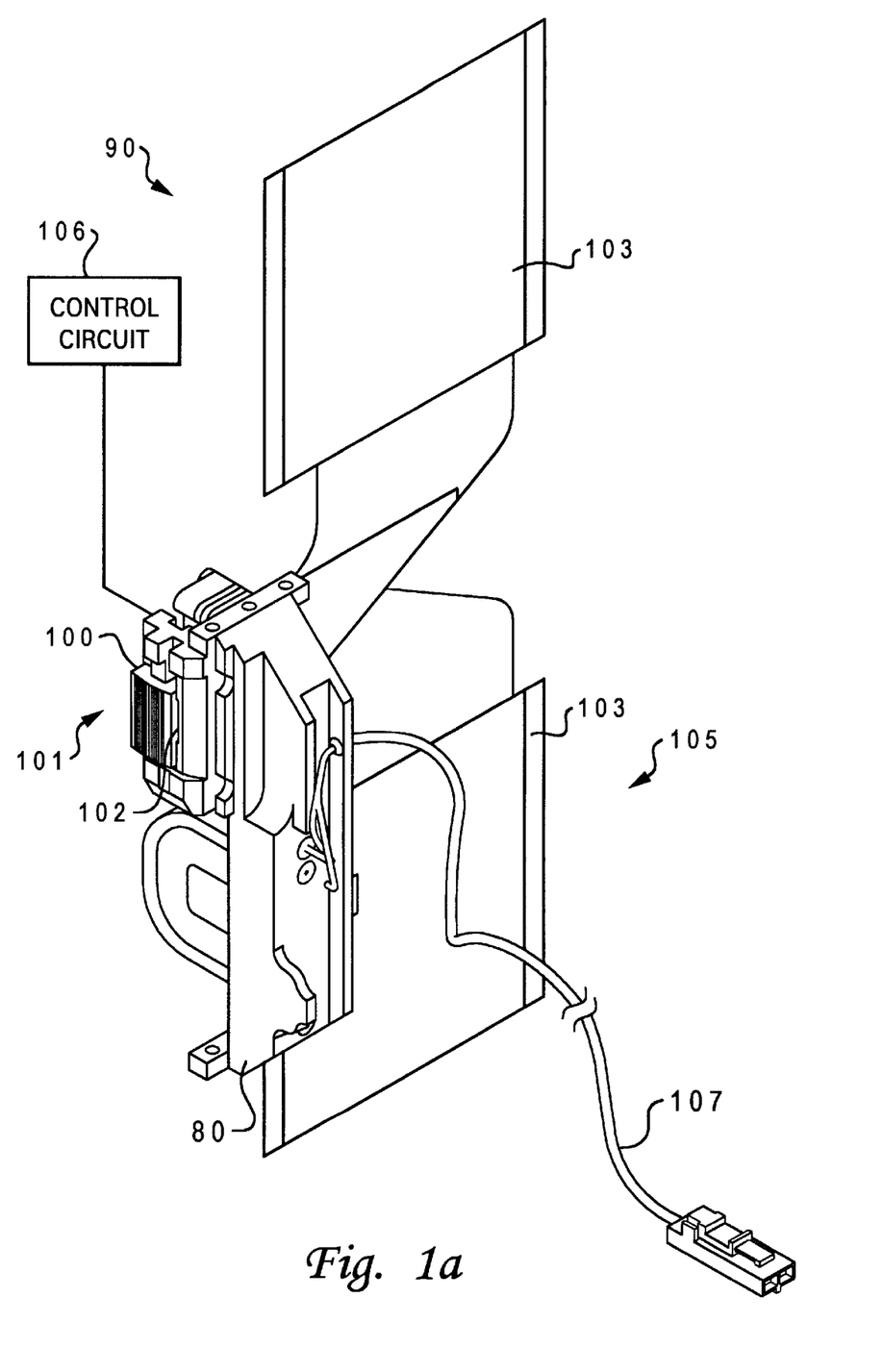
FIG. 1(a) is a pictorial representation of an oblique view of a magnetic head assembly, in accordance with a preferred embodiment of the present invention.

FIG. 1(a) is a pictorial representation of an oblique view of a magnetic data recording head assembly 90, in accordance with a preferred embodiment of the present invention. Magnetic data recording head assembly 90 includes an azimuth recording magnetic head 101, which can record data from magnetic data tracks azimuthally, while providing fine positioning servo tracking. Magnetic data recording head assembly 90 includes a head beam 103 and cable 107 which provides power to magnetic data recording head assembly 90 and azimuth recording magnetic head 101. Cable 107 is a two-wire twisted pair assembly. Magnetic data recording head assembly 90 also includes a head cable cover 103 which provides shielding and protection to cables coupled to azimuth recording magnetic head 101. Head beam 105 is an aluminum structure, which carries azimuth recording magnetic head 101 and an actuator coil in an integral structure.

Magnetic data recording head assembly 90 includes a control device, coupled to a left servo sensor located to the left of azimuth recording magnetic head 101. A control device is also coupled to a right servo sensor, which itself is located to the right of azimuth recording magnetic head 101 within magnetic data recording head assembly 90, such that the left and right servo sensors assist the magnetic recording head to tilt and rotate at a predetermined angle with respect to a particular data storage track while recording the data storage track during a recording operation, thereby increasing recording density and providing efficient azimuthal recording. Each control device operates under the control of a control circuit, which is illustrated in FIG. 1(b) as control circuit 106. Each control device is coupled to control circuit 106.

FIG. 1(b) is an exploded view of the magenetic head assembly 90 of FIG. 1(a), in accordance with a preferred embodiment of the present invention. In FIG. 1(a) and FIG. 1(b), like parts are indicated by like reference numerals. Thus, in FIG. 1(b) cable 107 is coupled to magnetic data recording head assembly 90 as in FIG. 1(a). A head cover 85 can be utilized to cover azimuth recording magnetic head 101. Head cover 85 can be installed after all the other elements are connected properly and following curing. A clamp 88 is utilized to cover a cable that can be connected to azimuth recording magnetic head 101. Beam coil 80 provides additional support to azimuth recording magnetic head 101. Clamp 76 provides additional support to head cable cover 103.

Figure 2:
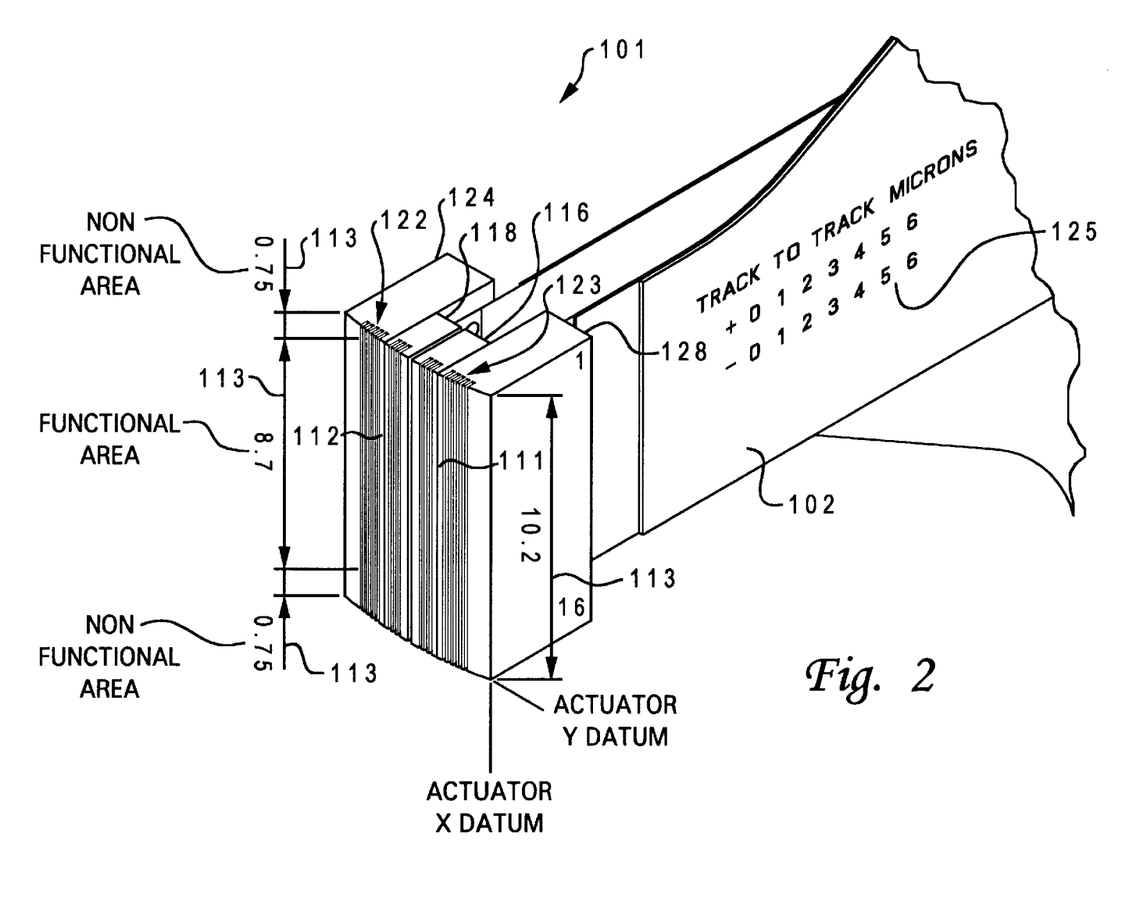
FIG. 2 is a pictorial representation of an angular view of the azimuth recording magnetic head of FIG. 1(a) and FIG. 1(b), in accordance with a preferred embodiment of the present invention.

FIG. 2 is a pictorial representation of an angular view of the azimuth recording magnetic head 101 of FIG. 1(a) and FIG. 1(b), in accordance with a preferred embodiment of the present invention. Azimuth recording magnetic head 101 includes a right module 116 and a left module 112. Each module contains interleaved read/write elements. Each module includes an extension located at either side of the main head of azimuth recording magnetic head 101. A right extension 128 is positioned to the right of right module 116. A left extension 124 is positioned to the left of left module 118. Left extension 124 and right extension 128 each contain only servo read elements. Right extension 128 contains servo read elements 123, while left extension 124 contains servo read elements 122. Multiple servo read elements may be maintained with these module extensions. In addition, azimuth recording magnetic head 101 includes two gaps, a left gap 112 and a right gap 111, each of which is skewed ±9 to 10 degrees respectively. Thus, when azimuth recording magnetic head 101 is in an azimuth recording mode, the servo read elements will be positioned perpendicular or orthogonal to the direction of tape motion, thereby reading timing information accurately relative to the position of azimuth recording magnetic head 101.

FIG. 2 also illustrates non-functional and functional areas, and the respective lengths of these areas, as indicated by arrows 113. For example, in FIG. 2 the length of the functional area is given as 8.7 and the respective lengths of the non-functional areas are indicated as 0.75. The length of the right and left modules is 10.2. Those skilled in the art will appreciate that although specific measurements are provided in FIG. 2, these measurements are for illustrative purposes only and other sizes and shapes may be utilized in accordance with a preferred embodiment of the present invention. Movement of head actuator directions are also indicated within FIG. 2 as "ACTUATOR Y DATUM" and "ACTUATOR X DATUM". Such X and Y datum indicators may be utilized to locate the head in a movable head beam, which is powered by an electrical coil. X and Y registers (not shown) along the sides of azimuth recording magnetic head 101 establish the end position of the head. A tape head actuator is utilized in accordance with azimuth recording magnetic head 101 for positioning purposes.

Figure 3:
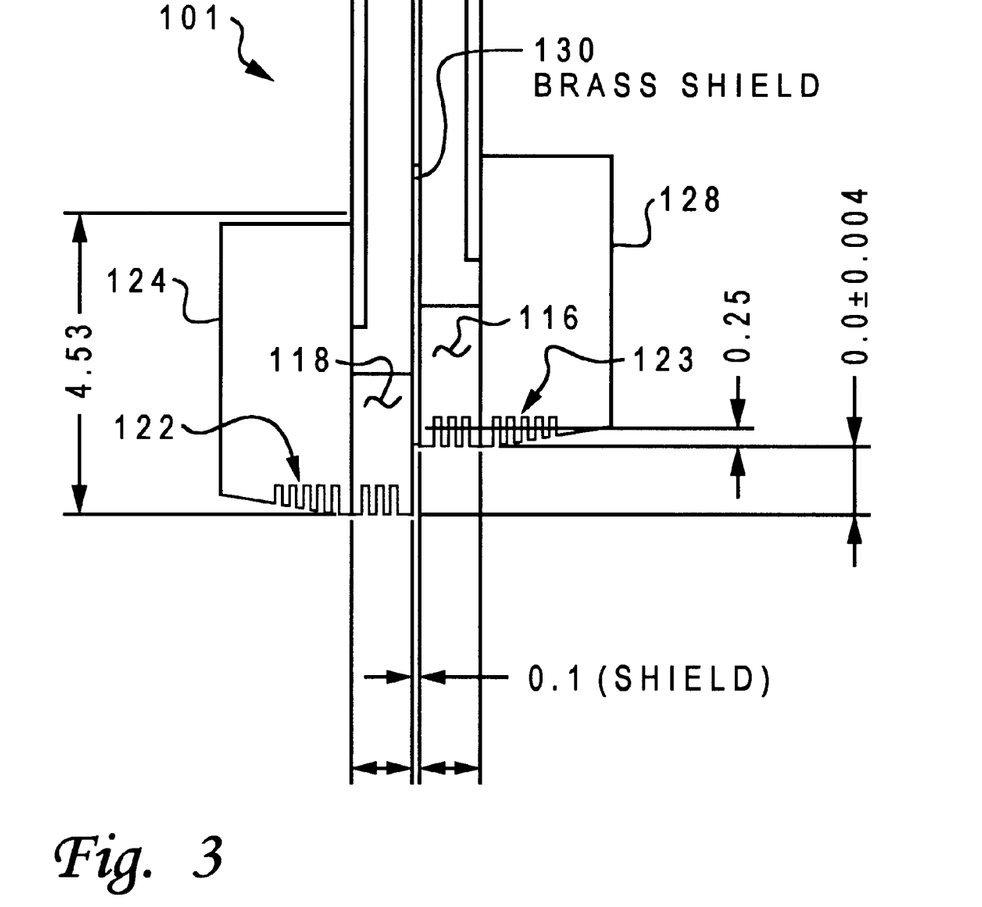
FIG. 3 illustrates a top view of the azimuth recording magnetic head of FIG. 2, in accordance with a preferred embodiment of the present invention.

FIG. 3 illustrates a top view of azimuth recording magnetic head 101 of FIG. 2, in accordance with a preferred embodiment of the present invention. In FIG. 2 and FIG. 3, like parts are indicated by like reference numerals. In FIG. 3 left module 118 is skewed slightly away from right module 116 to indicate an azimuthal recording position. Right extension 128 contains servo read elements 123, while left extension 124 contains servo read elements 122. The servo read elements are thus positioned on either side of the data tracks for either azimuth or non-azimuth recording, which has the effect of improving recording density, because data tracks can be organized in a particular predetermined pattern. The location of the current servo read elements function analogously to "speed bumps," when mixed in with the data tracks. A brass shield 130 is positioned at the center of azimuth recording magnetic head 101. Azimuth recording magnetic head 101 includes right module 116 and left module 118 and brass shield 130. The width of the brass shield is approximately 0.1. Right extension 128 and right module 116 are positioned approximately 0.004 behind left module 118 and left extension 124.

Figure 4:
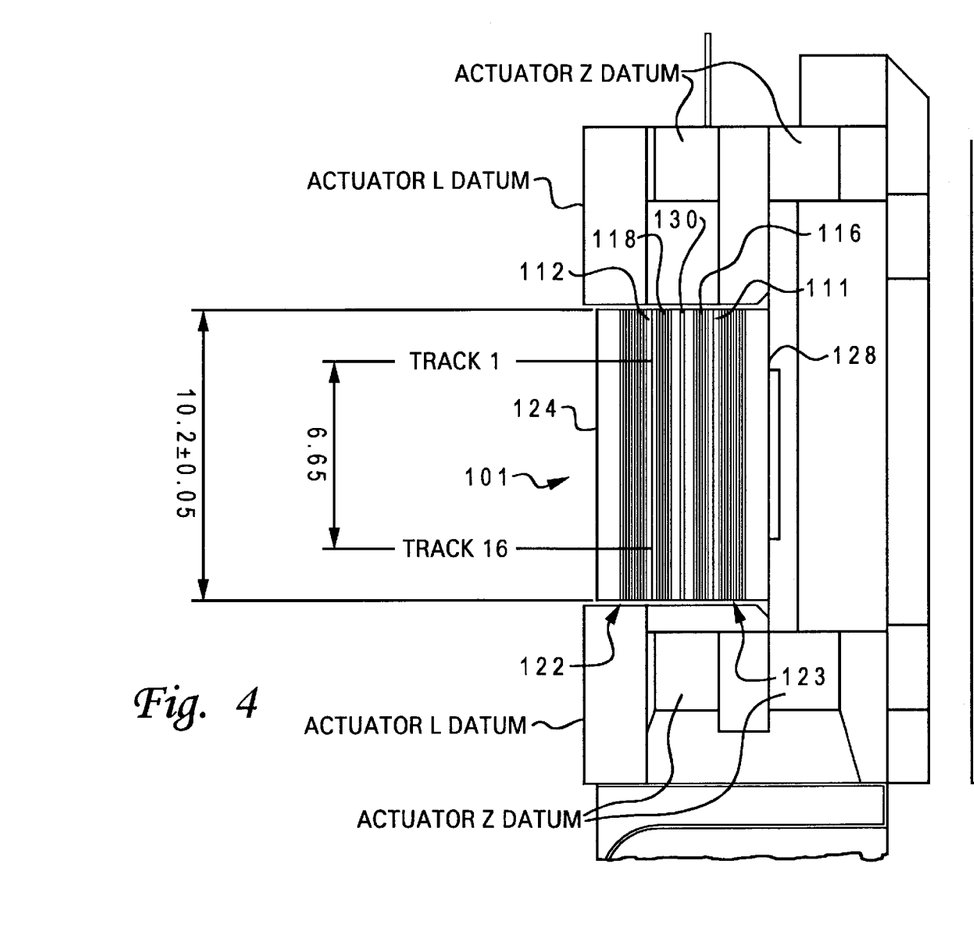
FIG. 4 illustrates an angular front view of the azimuth recording magnetic head of FIG. 3, in accordance with a preferred embodiment of the present invention.

FIG. 4 illustrates an angular front view of the magnetic recording head of FIG. 3, in accordance with a preferred embodiment of the present invention. In FIG. 2, FIG. 3 and FIG. 4, like parts are indicated by like reference numerals. Actuator axis are also indicated in FIG. 4. Thus, "ACTUATOR Z DATUM" indicates movement along a z-axis by an actuator. "ACTUATOR L DATUM" indicates movement along an l-axis. L and Z datum indicators are utilized to locate azimuth recording magnetic head 101 in a movable head beam, which is powered by an electrical coil. Thus, L and Z registers are located on the sides of azimuth recording magnetic head 101 to establish L and Z axis positioning for the azimuth recording magnetic head 101.

Figure 5A:
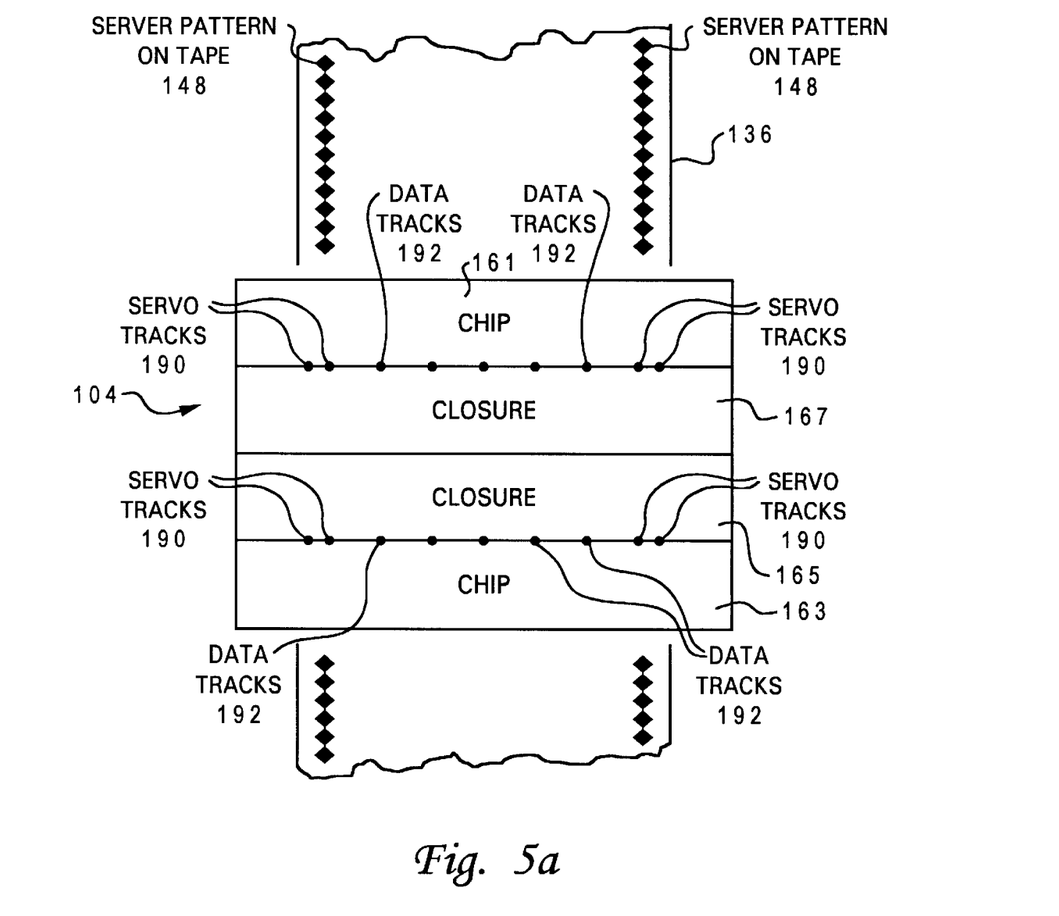
FIG. 5(a) illustrates a top view of a prior art non-azimuth recording magnetic head.

FIG. 5(a) illustrates a top view of a prior art non-azimuth recording magnetic head 104. In FIG. 5(a) and FIG. 5(b), like parts are indicated by like reference numerals. Tape 136, utilized in accordance with non-azimuth recording magnetic head 104 includes a servo pattern 148. Servo tracks are indicated at 190. Non-azimuth recording magnetic head 104 includes two chip sections (i.e., chip sections 161 and 163). Positioned between these chip sections are closure sections 165 and 167.

FIG. 5(b) depicts a top view of an azimuth recording magnetic head 101 in both a normal recording pattern 132 and an azimuthal recording pattern 134, in accordance with a preferred embodiment of the present invention. A tape being read or written to by an azimuth recording magnetic head includes a particular servo pattern 148. Servo pattern 148 is composed of servo diamonds, as illustrated in FIG. 5(b). The azimuth recording magnetic head 101 is shown not only over tape 136 at a normal recording pattern 132 and an azimuthal recording pattern 134, but is also indicated physically at 150. In FIG. 5(b), each depicted azimuth recording magnetic head 101 includes four chip sections 152, 156, 158 and 160, 180 and 182.

Each chip section may be composed of ferrite material, on which thin film magnetic recording head layers are deposited and then closed off with Barrium Titenate Carbide (BTC), a form of ceramic that mates with each of the aforementioned chip sections. Each azimuth recording magnetic head 101 includes a BTC section. BTC section 164 is included within left extension 124, while BTC section 162 is included within right extension 128. In addition, as indicated in FIG. 5(a) and FIG. 5(b), a number of servo tracks are indicated at 190. A number of data tracks are located within left gap 112 between chip section 182 and closure 200. The servo head track elements are located far apart from one another in order to provide improved average accuracy due to hydroscopic thermal expansions inherent with DLT. In other words, the servo head elements are located on either side of (i.e., and external to) all of the data head elements.

Data tracks are positioned between closure 202 and chip section 180 within right gap 111. Servo tracks 190 are shown situated between chip section 152 and BTC section 164 at servo gap 140a. Similar servo tracks are positioned between BTC section 164 and chip 156 at servo gap 140b, between BTC section 162 and chip section 160 at servo gap 140c, and between BTC section 162 and chip section 158 at servo gap 140d. As indicated in FIG. 5(b), left gap 112 and right gap 111 are each skewed ±9 to 10 degrees respectively. Those skilled in the art will appreciate in that the example depicted in FIG. 5(b), one set of servo read elements is utilized for one direction of tape motion and another set of servo read elements is utilized for the reverse direction of motion.

Figure 6:
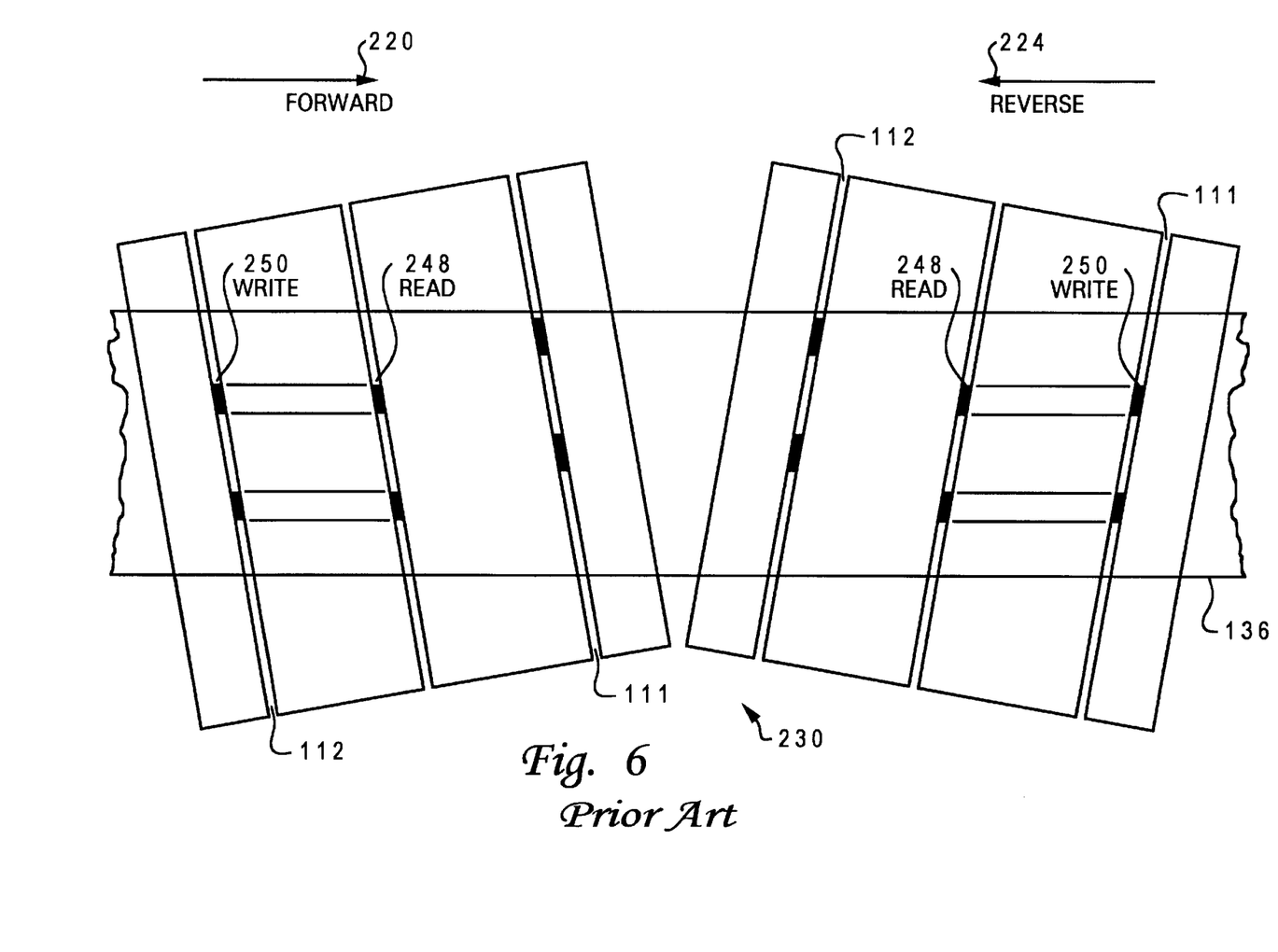
FIG. 6 illustrates a pictorial diagram illustrative of prior art tape motion and general principals of azimuth tape recording.

FIG. 6 illustrates a pictorial diagram 230 illustrative of prior art tape motion and general principals of azimuth tape recording. FIG. 6 depicts the geometrical relationship of azimuth recording in a "read after write" mode. In the example depicted in FIG. 6, a three-gap head is provided. Two outer modules may be composed of write heads, while the middle portion may comprise a read head. Either write head can be utilized for one direction of tape motion and the other for reverse direction. Tape motion with respect to data tracks contained on tape 236 is depicted in FIG. 6. Arrow 220 indicates a forward motion, wherein write elements 248 and read elements 250 respectively write or read data to tracks contained on tape 136. Likewise, arrow 224 indicates a reverse motion, wherein write and read elements 250 and 248 respectively write or read data to tracks contained on tape 136. Left gap 112 and right gap 111 are also depicted in FIG. 6 in both forward and reverse motion positions. Left gap 112 and right gap 111 are analogous to the respective left and right gaps pictured and described herein with respect to all drawings. An interleaved magnetic read/write head may be utilized in association with the tape motion depicted in FIG. 6.

Figure 7:
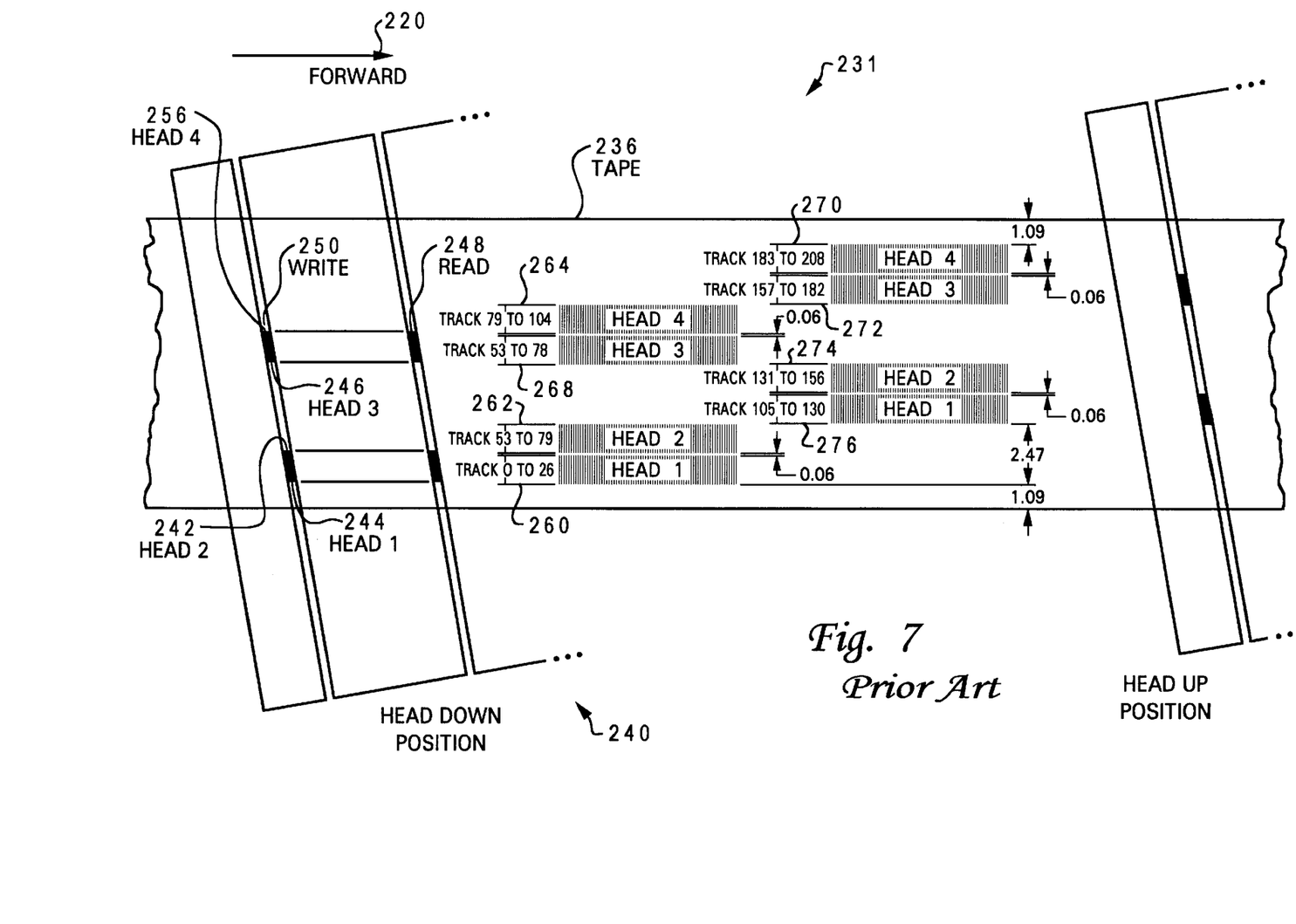
FIG. 7 illustrates a detailed pictorial diagram illustrative of prior art forward azimuth tape recording and additional general principals of azimuth recording.

FIG. 7 illustrates a detailed pictorial diagram 231 illustrative of prior art forward azimuth tape recording and additional general principals of azimuth recording. Servo elements are not depicted in FIG. 7. Arrow 220 indicates a forward motion, wherein write elements 250 and read elements 248. In FIG. 6 and FIG. 7, like parts are indicated by like reference elements. Four heads are depicted in FIG. 7, which function to write or read data to or from data tracks contained on tape 236. The data tracks contained on tape 136 are analogous to data tracks 192 depicted in FIG. 6.

In FIG. 7, first head 244 writes or read data to or from tracks 1 to 26, as indicated at 260. First head 244, in a reverse motion (not shown in FIG. 7), also functions reads or writes data from or to tracks 105 to 130, as indicated at 276. Second head 242 functions to write or reads data to or from tracks 53 to 79, as indicated at 262. Second head 242, in a reverse motion (not shown in FIG. 7) also writes or reads data to or from tracks 131 to 156, as indicated at 274. Third head 246 writes or reads data to or from tracks 53 to 78, as indicated at 268. Third head 246, in a reverse motion (not shown in FIG. 7) reads or writes data from or to tracks 157 to 182, as indicated at 172. Fourth head 256 writes or reads to or from tracks 79 to 104, as indicated as 264. Fourth head 256, in a reverse motion, also writes or reads data to or from tracks 183 to 208 as indicated at 270.

Figure 8:
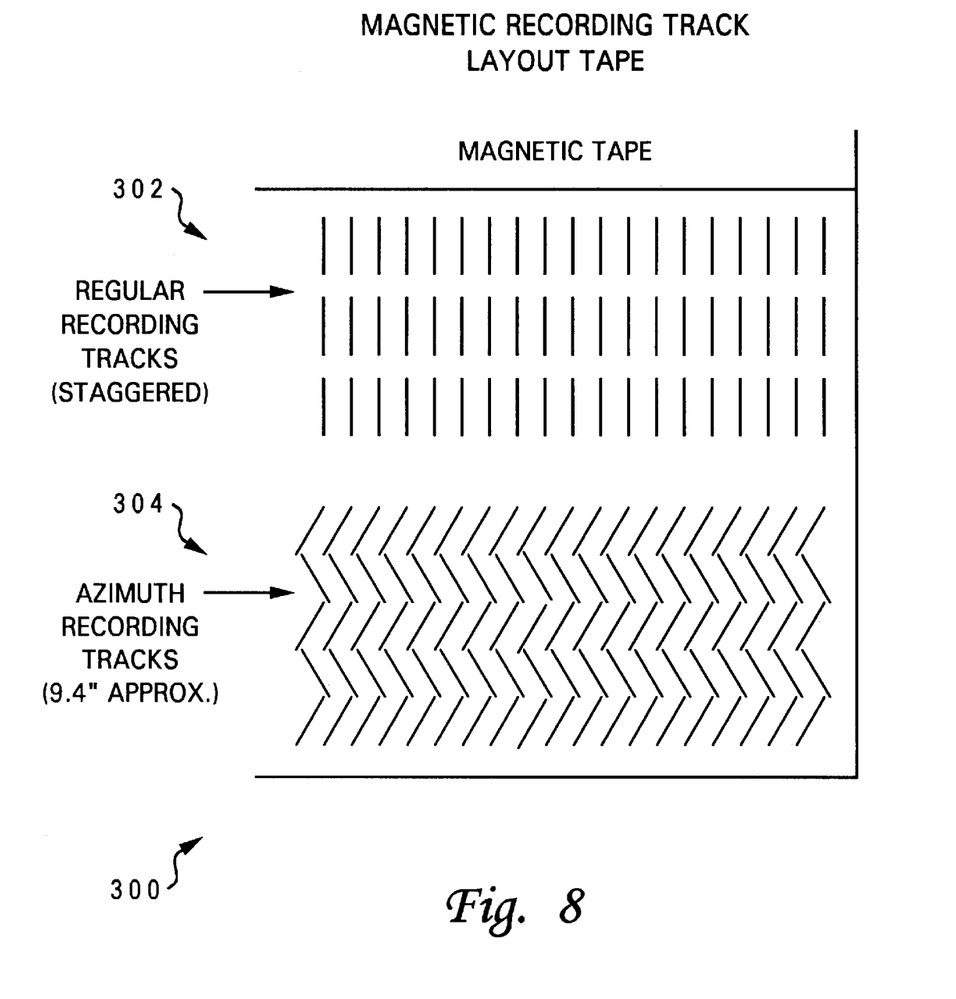
FIG. 8 depicts a magnetic recording track layout for both regular recording tracks and azimuth recording tracks, in accordance with a preferred embodiment of the present invention.

FIG. 8 depicts a magnetic recording track layout 300 for both regular recording tracks 302 and azimuth recording tracks 304, in accordance with a preferred embodiment of the present invention. Regular recording tracks 302 indicate a "regularized" or "even" layout. Azimuth recording tracks 304 indicate a "zig zag" pattern. This "zig zag" pattern indicates that the servo head element (i.e., reader) of azimuth recording magnetic head 101 is angled at approximately 9.5 degrees in either direction. Those skilled in the art can appreciate that "zig" represents one direction of tape motion and the "zag" represents the recording pattern produced in the reverse tape motion, hence the term "zig zag." The servo reader in Azimuth recording is orthogonal to the tape motion, thereby reading the timing information accurately relative to the position of azimuth recording magnetic head 101 against the tape during azimuth recording. The data head of azimuth recording magnetic head 101 is positioned at an angle with respect to the tape motion.

When taken together, the aforementioned drawings describe a magnetic recording apparatus and method for the azimuthal recording of data to and from data storage tracks contained on DLT. The magnetic recording apparatus thus includes magnetic data recording head assembly 90. Magnetic recording head 101 is centrally located within magnetic data recording head assembly 90. Magnetic data recording head assembly 90 includes a control device, coupled to a left servo sensor that is located to the left of the magnetic recording head. The magnetic recording apparatus additionally includes a control device, coupled to a right servo sensor that is located to the right of the magnetic recording head within the magnetic data recording head assembly.

The left and right servo sensors assist the magnetic recording head to tilt and rotate at a predetermined angle with respect to a particular data storage track contained on DLT, during a recording operation, thereby increasing recording density and providing improved azimuthal recording. Magnetic recording head 101 includes a left module and a right module. The left module includes left servo sensor elements skewed for azimuth recording, and the right module includes right servo sensor elements skewed for azimuth recording. In order to improve recording density and fine servo positioning, the left servo sensor elements and the right servo sensor elements are composed of only read elements (i.e. servo read elements 122 and 123).

Those skilled in the art can appreciate that the azimuth recording head described herein may be utilized not only for azimuth recording, but also for non-azimuth recording of data from data tracks. The magnetic recording apparatus and method presented has been described in terms of primarily an azimuth recording system. However, an azimuth recording track pattern is not required for implementation of a preferred embodiment of the present invention. The magnetic recording head and magnetic data recording head assembly described herein can be utilized in a tape system with standard track patterns in which the direction of magnetization of data is the same.

Thus, while the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A magnetic recording apparatus for the azimuthal recording of data to and from data storage tracks, wherein said magnetic recording apparatus includes a magnetic data recording head assembly, said magnetic recording apparatus comprising:

a magnetic recording head centrally located within said magnetic data recording head assembly;

control means within said magnetic data recording head assembly, coupled to at least one left servo sensor, wherein said at least one left servo sensor is located to the left of and external to said magnetic recording head; and control means within said magnetic data recording head assembly, coupled to at least one right servo sensor, wherein said at least one right servo sensor is located to the right of and external to said magnetic recording head, such that said left and right servo sensors assist said magnetic recording head to tilt and rotate at a predetermined angle with respect to a particular data storage track while recording said data storage track during a recording operation, thereby increasing recording density and providing efficient azimuthal recording.

2. The magnetic recording apparatus of claim 1 wherein said magnetic data recording head assembly further comprises:

means for recording data at an azimuth angle.

3. The magnetic recording apparatus of claim 2 wherein said magnetic recording head comprises a left module and a right module.

4. The magnetic recording apparatus of claim 3 wherein:

said left module comprises left servo sensor elements skewed for azimuth recording; and said right module comprises right servo sensor elements skewed for azimuth recording.

5. The magnetic recording apparatus of claim 4 wherein:

said left servo sensor elements comprise only read elements; and said right servo sensor elements comprise only read elements.

6. The magnetic recording apparatus of claim 5 further comprising a storage tape comprising data storage tracks.

7. The magnetic recording apparatus of claim 6 further comprising:

means for positioning said left servo sensor elements perpendicular to the direction of the movement of said storage tape during a recording operation.

8. The magnetic recording apparatus of claim 7 further comprising:

means for positioning said right servo sensor elements perpendicular to the direction of the movement of said storage tape during a recording operation.

9. The magnetic recording apparatus of claim 8 wherein said magnetic recording head comprises an interleaved read/write magnetic recording head.

10. The magnetic recording apparatus of claim 9 further comprising:

means for reading a preformatted magnetic recording tape utilizing timing servo data to position said magnetic recording head against data recording tracks contained on said preformatted magnetic recording tape.

11. The magnetic recording apparatus of claim 8 wherein said a magnetic recording head comprises a magnetic recording head that may be utilized in a non-azimuthal recording mode in additional to an azimuthal recording mode.

12. A method for the azimuthal recording of data to and from data storage tracks utilizing a magnetic data recording head assembly, said magnetic recording apparatus comprising:

mounting a magnetic recording head centrally within a magnetic data recording head assembly;

coupling a control means within said magnetic data recording head assembly to at least one left servo sensor, wherein said at least one left servo sensor is located to the left of and external to said magnetic recording head; and connecting a control means within said magnetic data recording head assembly to at least one right servo sensor, wherein said magnetic data recording head assembly is located to the right of and external to said magnetic recording head, wherein said left and right servo sensors assist said magnetic recording head to tilt and rotate at a predetermined angle with respect to a particular data storage track while recording said data storage track during a recording operation, thereby increasing recording density and providing efficient azimuthal recording.

13. The method of claim 12 further comprising the step of:

recording data at an azimuth angle utilizing said magnetic data recording head assembly.

14. The method of claim 13 further comprising the step of:

configuring said magnetic recording head to include a left module and a right module.

15. The method of claim 14 wherein the step of configuring said magnetic recording head to include a left module and a right module, further comprises the step of configuring said magnetic recording head to include a left module and a right module, such that said left module comprises left servo sensor elements skewed for azimuth recording; and said right module comprises right servo sensor elements skewed for azimuth recording.

16. The method of claim 15 further comprising the steps of:

configuring said left servo sensor elements and said right servo sensor elements to comprise only read elements.

17. The method of claim 16 further comprising the step of:

providing a storage tape comprising data storage tracks, wherein data may be written to and from said storage tape by said magnetic data recording head assembly.

18. The method of claim 17 further comprising the step of:

positioning said left servo sensor elements perpendicular to the direction of the movement of said storage tape during a recording operation.

19. The method of claim 18 further comprising the step of:

positioning said right servo sensor elements perpendicular to the direction of the movement of said storage tape during a recording operation.

20. The method of claim 19 further comprising the step of:

configuring said magnetic recording head to comprise an interleaved read/write magnetic recording head.

21. The method of claim 20 further comprising the step of:

reading a preformatted magnetic recording tape utilizing timing servo data to position said magnetic recording head against data recording tracks contained on said preformatted magnetic recording tape.

22. The method of claim 21 further comprising the step of:

recording data tracks in a non-azimuthal recording mode utilizing said magnetic recording head, wherein said magnetic recording head may be utilized in a non-azimuthal recording mode in addition to an azimuth recording mode.

* * * * *